UNITED STATES PATENT OFFICE.

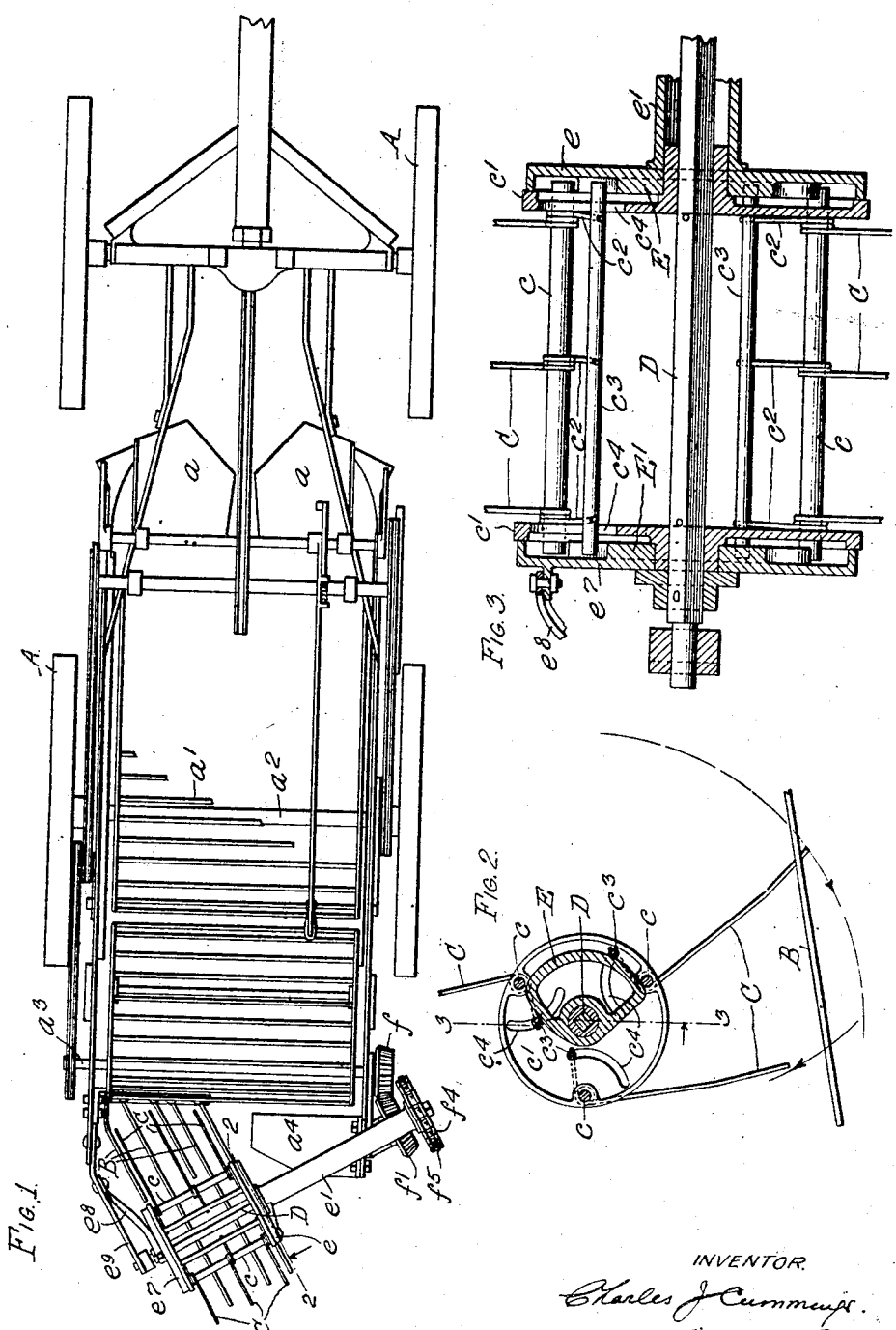

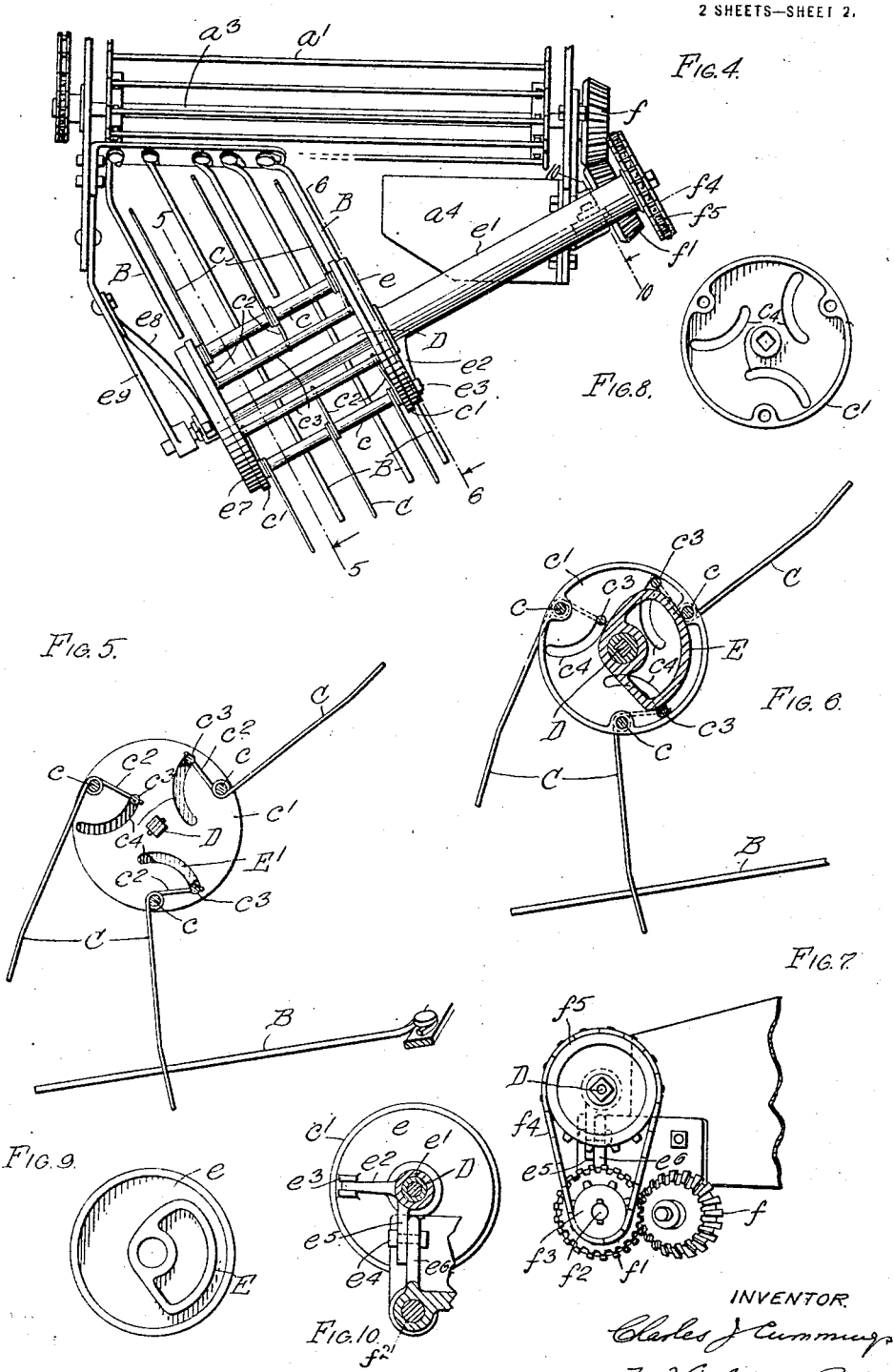

CHARLES J. CUMMINGS, OF TULLY, NEW YORK.

VINE-REMOVING MECHANISM FOR POTATO-DIGGERS.

1,285,633.   Specification of Letters Patent.   Patented Nov. 26, 1918.

Application filed September 8, 1917. Serial No. 190,286.

*To all whom it may concern:*

Be it known that I, CHARLES J. CUMMINGS, a citizen of the United States, residing at Tully, in the county of Onondaga and State of New York, have invented a new and useful Improvement in Vine-Removing Mechanism for Potato-Diggers, of which the following is a specification.

This invention relates to improvements in potato diggers or harvesting machines, and more particularly to means for removing potato vines from a machine of this kind.

The objects of the invention are to produce a mechanism for efficiently and positively removing the potato vines in such a manner that the vines will not become entangled with or clog up the vine removing mechanism; also to provide a mechanism of this kind which is capable of easily removing the largest quantities of vines which may be fed to the mechanism and which requires no shaking or vibrating parts; also to improve mechanisms of this kind in other respects hereinafter specified.

In the accompanying drawings:

Figure 1 is a top plan view of a potato harvester provided with a vine removing mechanism embodying the invention.

Fig. 2 is a fragmentary sectional elevation thereof on an enlarged scale on line 2—2, Fig. 1.

Fig. 3 is a transverse sectional elevation thereof on a still larger scale on line 3—3, Fig. 2.

Fig. 4 is a fragmentary plan view thereof showing the driving connection between the potato digger and the vine removing mechanism.

Figs. 5 and 6 are sectional elevations thereof respectively on lines 5—5 and 6—6, Fig. 4.

Fig. 7 is a fragmentary side elevation thereof showing the driving connection between the vine removing mechanism and the separating mechanism of the potato digger.

Figs. 8 and 9 are elevations respectively of the revolving guide and the fixed cam plate of the vine removing mechanism, showing the same detached from the machine.

Fig. 10 is a fragmentary sectional elevation of the vine removing mechanism on line 10—10, Fig. 4.

The potato digger may be of any suitable construction, that shown having a frame mounted on wheels A and provided with plows $a$ which dig the potatoes from the ground and pass them upon a traveling separator apron or screen $a'$ on which the loose earth is shaken from the potatoes and which carries the potatoes and the vines to the rear of the machine, where the potatoes are dropped upon the ground. The separator apron passes over suitable sprocket wheels secured on a driving shaft $a^2$ and a driven shaft $a^3$, both shafts being suitably journaled on the frame of the digger. $a^4$ represents a plate or deflector arranged on the rear end of the digger for deflecting potatoes dropped from the separator apron toward the middle of the path traversed by the digger.

The potato vines are carried by the separator apron to the rear end of the machine and dropped. In order to prevent the potato vines from falling upon the potatoes dropped from the separator apron, means are provided for discharging the vines toward one side of the path taken by the machine. For this purpose a plurality of bars B are provided which are secured to one side of the frame of the machine below the separator apron and which extend toward the opposite side of the machine, being arranged obliquely with regard to the length of the machine. The bars are spaced far enough apart to permit the potatoes to pass through the spaces between the bars.

In order to insure the removal of the vines from the bars B a plurality of fingers or arms C is preferably provided which are rotated by a shaft D in such a manner that vines will be pushed toward the outer ends of the bars B without becoming entangled with the fingers. For this purpose the fingers are secured to rods or bars $c$ journaled in heads or disks $c'$ secured to and adapted to rotate with the shaft D. The fingers are provided with extensions $c^2$ which, in the construction shown, are bent at an angle to the fingers and which are secured to rods $c^3$, one of these rods being employed for each of the sets of fingers. The rods $c^3$ control the positions of the fingers with regard to the axis of the shaft D and are preferably adapted to move in slots $c^4$ in the heads or disks $c'$, the slots being substantially concentric with the rods $c$. By means of this arrangement the fingers may be swung into positions in which they extend substantially radially with regard to the disks $c'$ to positions substantially tangential to the disks $c'$ while rotating about the axis of this shaft.

Means are preferably employed for causing the fingers to extend outwardly from the shaft D when engaging the vines on the bars B so that the outer ends of the fingers will move at a comparatively high velocity when pushing the vines from the bars, thus giving the fingers a whipping action, which has been found very effective. When the fingers reach the outer portions of the bars, their velocity is retarded and they are withdrawn from the vines substantially in the direction of their length. In the construction shown, the movement of the fingers is controlled by two relatively stationary cams E E' arranged in proximity to the disks $c'$, the cam E being preferably secured on or formed integral with an end or cam plate $e$ which is secured on a tubular housing or sleeve $e'$ secured on the frame of the machine and through which the shaft D extends. The sleeve has an arm or extension $e^2$ which enters between lugs $e^3$ on the cam plate $e$ to hold this plate against movement relatively to the sleeve, and the sleeve is suitably secured to the frame of the machine by means of a bolt $e^4$ connecting lugs or projections $e^5$ and $e^6$ respectively on the sleeve $e'$ and the frame of the machine. The other cam E' is formed integral with or secured to a cam plate $e^7$ which is secured to an arm $e^8$ connected to an arm or extension $e^9$ of the frame of the machine, in the end of which the shaft D is journaled. The cams are so positioned with regard to the ends of the finger actuating rods $c^3$ that the fingers extend in a substantially radial direction with regard to the shaft D when the fingers engage the vines to push them toward the ends of the bars B, and when extending in this direction will remove the vines from the bars with a whipping action owing to the increased velocity with which the ends of the fingers move when extending outwardly from the shaft D. When the fingers reach a position near the outer ends of the bars, they assume positions substantially tangential with regard to the disks $c'$ so that the ends of the fingers move slower than when extending outwardly from the shaft and are withdrawn upwardly from the vines substantially in the direction of the length of the fingers. This enables the fingers to be removed from the vines without twisting or winding the vines on the fingers or other rotary parts of the vine removing mechanism, so that this mechanism remains clean at all times and operates efficiently to remove the vines from the bars.

The shaft D, to which the disks $c'$ carrying the vine removing fingers C are secured, may be rotated in any suitable manner. In the construction shown, the shaft $a^3$ of the separating mechanism is provided with a bevel gear $f$ engaging with a bevel gear $f'$ secured on a countershaft $f^2$, suitably journaled on a part of the frame of the machine.

The bevel gear $f'$ has a sprocket wheel $f^3$ connected by means of a sprocket chain $f^4$ with a sprocket wheel $f^5$ mounted on the shaft D of the vine removing mechanism.

I claim as my invention:

1. In a potato digger, the combination with potato digging and separating means, of a plurality of bars arranged at the discharge end of said separating means to receive the material discharged therefrom, said bars being spaced apart to retain only said vines, a rotary member mounted above said bars, fingers mounted on said member and adapted to move lengthwise of said bars to push the potato vines along said bars, and mechanism for actuating said fingers to cause the same to assume substantially radial positions with regard to said rotary member while pushing the vines from said bars and substantially tangential positions with regard to said member when the fingers are moved upwardly out of engagement with said vines whereby the fingers will have a whipping action while removing the vines from said bars and will be withdrawn from the vines substantially in the direction of the length of said fingers.

2. In a potato digger, the combination with potato digging and separating means, of a plurality of bars arranged at the discharge end of said separating means to receive the material discharged therefrom, said bars being spaced apart to retain only said vines, and extending obliquely with regard to the length of said digger to discharge the vines at one side of the digger, a rotary member mounted above said bars and having its axis extending crosswise of said bars, fingers on said member adapted to pass between said bars to push the potato vines along said bars, and mechanism for actuating said fingers to cause the same to assume substantially radial positions with regard to said rotary member while pushing the vines from said bars and substantially tangential positions with regard to said member when the fingers are moved upwardly out of engagement with said vines whereby the fingers will be withdrawn from the vines substantially in the direction of the length of said fingers and will engage the vines with a whipping action.

3. In a potato digger, the combination with potato digging and separating means, of a plurality of bars to which the potato vines are delivered by said separating means, a plurality of fingers adapted to rotate in planes substantially parallel to said bars, disks on which said fingers are pivotally mounted, means for rotating said disks, and cams which are fixed relatively to said disks and with which said fingers engage and which change the positions of the fingers to cause the same to assume positions substantially radial with regard to said disks when said fingers are pushing vines from said bars, and to cause the fingers to be withdrawn from engagement with said vines substantially in the direction of their length.

4. In a potato digger, the combination with potato digging and separating means, of a plurality of bars to which the potato vines are delivered by said separating means, a plurality of fingers adapted to rotate in planes substantially parallel to said bars, rods to which said fingers are secured, disks on which said rods are pivoted, means for rotating said disks, and cams with which said rods engage and which change the positions of the fingers to cause the same to assume positions substantially radial with regard to said disks when said fingers are pushing vines from said bars, and to cause the fingers to be withdrawn from engagement with said vines substantially in the direction of their length.

5. In a potato digger, the combination with potato digging and separating means, of a plurality of bars to which the potato vines are delivered by said separating means, a plurality of fingers adapted to rotate in planes substantially parallel to said bars, rods on which said fingers are secured, disks on which said rods are pivoted, a shaft on which said disks are secured, means for rotating said shaft, and cams with which said rods engage and which change the positions of the fingers to cause the same to assume positions substantially radial with regard to said disks when said fingers are pushing vines from said bars, and to cause the fingers to be withdrawn from engagement with said vines substantially in the direction of their length.

6. In a potato digger, the combination with potato digging and separating means, of a plurality of bars to which the potato vines are delivered by said separating means, a plurality of fingers adapted to rotate in planes substantially parallel to said bars, rods on which said fingers are secured, disks on which said rods are pivoted, a shaft on which said disks are secured, means for rotating said shaft, a tubular housing in which said shaft is journaled and which is mounted on the digger, and cams with which said rods engage to cause said fingers to assume substantially radial positions when pushing the vines along said bars and to assume positions substantially tangential to said disks when said fingers are moving out of engagement with said vines.

7. In a potato digger, the combination with potato digging and separating means, of a plurality of bars to which the potato vines are delivered by said separating means, a plurality of fingers adapted to rotate in planes substantially parallel to said bars, rods on which said fingers are secured, disks on which said rods are pivoted, a shaft on which said disks are secured, driving connections between said separating means and said shaft for rotating said shaft, and cams with which said rods engage to cause said fingers to assume substantially radial positions when pushing the vines along said bars and to assume positions substantially tangential to said disks when said fingers are moving out of engagement with said vines.

8. In a potato digger, the combination with potato digging and separating means, of a plurality of bars to which the potato vines are delivered by said separating means and which extend obliquely with regard to the length of said digger to discharge the vines at one side of the digger, disks arranged above said bars in planes substantially parallel with said bars, fingers on said disks, a shaft on which said disks are mounted and which extends obliquely with regard to said digger and which is driven from said separating mechanism, means for changing the positions of said fingers relatively to said disks to cause said fingers to assume substantially radial positions when pushing the vines from said bars and substantially tangential positions when said fingers are being withdrawn from said vines, and means for rotating said disks.

9. In a potato digger, the combination with potato digging and separating means, of a plurality of bars to which the potato vines are delivered by said separating means, a plurality of fingers adapted to rotate in planes substantially parallel to said bars, rods on which said fingers are secured, rotary members on which said rods are pivoted, relatively stationary cams, and arms on said rods engaging said cams and which cause the rods to rotate to shift the positions of said fingers.

10. In a potato digger, the combination with potato digging and separating means, of a plurality of bars to which the potato vines are delivered by said separating means, a plurality of fingers adapted to rotate in planes substantially parallel to said bars, rods on which said fingers are secured, rotary members on which said rods are pivoted, relatively stationary cams, arms on said rods engaging said cams and which cause the rods to rotate to shift the positions of said fingers, and slots on said rotary members which guide said arms in their movements relatively to said cams.

Witness my hand, this 5th day of September, 1917.

CHARLES J. CUMMINGS.

Witnesses:
H. H. HURLBUT,
F. M. BROWN.